(12) United States Patent
Carrette

(10) Patent No.: US 8,065,856 B2
(45) Date of Patent: Nov. 29, 2011

(54) MARKER SYSTEM WITH MARKER AND INSTALLATION APPARATUS

(75) Inventor: Paul M. Carrette, Garretson, SD (US)

(73) Assignee: Flagshooter, LLC, Garretson, SD (US)

( * ) Notice: Subject to any disclaimer, the term of this patent is extended or adjusted under 35 U.S.C. 154(b) by 110 days.

(21) Appl. No.: 12/435,167

(22) Filed: May 4, 2009

(65) Prior Publication Data

US 2010/0276468 A1 Nov. 4, 2010

(51) Int. Cl.
*B25C 5/10* (2006.01)
*B25F 7/05* (2006.01)

(52) U.S. Cl. ............... 53/120; 53/109; 53/139; 53/156; 116/173; 248/530

(58) Field of Classification Search ............ 173/90; 227/109, 119, 120, 132, 135, 136, 139, 156; 116/173, 175; 248/511, 530, 532, 533
See application file for complete search history.

(56) References Cited

U.S. PATENT DOCUMENTS

| | | | |
|---|---|---|---|
| 242,644 A | 6/1881 | Fetterman | |
| 343,365 A | 6/1886 | Daniels | |
| 433,124 A | 7/1890 | Hall | |
| 1,071,406 A | 8/1913 | Engel | |
| 2,638,867 A * | 5/1953 | Felton | 116/173 |
| 2,859,685 A | 11/1958 | Alexander | |
| 3,158,132 A * | 11/1964 | Guthrie | 116/173 |
| 3,182,936 A * | 5/1965 | Murdock | 248/530 |
| 3,309,048 A * | 3/1967 | Rousselet | 248/87 |
| 3,684,224 A * | 8/1972 | Kwako | 248/87 |
| 4,103,445 A | 8/1978 | Smith | |
| 4,343,449 A * | 8/1982 | Osthus | 248/156 |
| 4,520,985 A * | 6/1985 | Blumenthal | 248/530 |
| 4,627,563 A * | 12/1986 | Meyer | 227/130 |
| 4,706,864 A * | 11/1987 | Jacobsen et al. | 227/109 |
| 4,826,066 A * | 5/1989 | Koester et al. | 227/120 |
| D304,039 S * | 10/1989 | Henderson et al. | D20/10 |
| 5,025,969 A * | 6/1991 | Koester et al. | 227/120 |
| 5,238,322 A * | 8/1993 | Stirtz | 404/10 |
| 5,247,900 A | 9/1993 | Sobczak | |
| D358,628 S | 5/1995 | Lenort | |
| 5,671,814 A | 9/1997 | Smith | |
| 5,918,565 A | 7/1999 | Casas | |
| 5,988,296 A | 11/1999 | Zachman | |
| 6,009,652 A | 1/2000 | Smith | |
| 6,015,122 A * | 1/2000 | Qui | 248/156 |
| 6,053,260 A * | 4/2000 | Boon et al. | 173/90 |
| 6,085,452 A | 7/2000 | Davis | |
| 6,435,129 B1 * | 8/2002 | McDonald et al. | 116/211 |
| 6,450,388 B1 * | 9/2002 | Denton | 227/120 |
| 6,571,885 B2 * | 6/2003 | Lee et al. | 173/1 |

(Continued)

*Primary Examiner* — Paul Durand
(74) *Attorney, Agent, or Firm* — Cutler & Donahoe, LLP; Jared R. Clark

(57) ABSTRACT

A marker installation system comprises a marker comprising a shaft having a bottom end and a top end, and including an insertion portion, a mast portion, and an engagement portion located between the insertion portion and the mast portion. The engagement portion is configured to resist further insertion of the shaft into the ground beyond the insertion portion. The system includes a marker installation apparatus including a magazine assembly defining a magazine space in which the marker is positioned. The magazine space has a push position in the magazine space for receiving the marker. The apparatus includes a push assembly mounted on the magazine assembly to engage the engagement portion of the marker when the marker is located in the push position. The push assembly pushes the marker from the push position of the magazine assembly when the push assembly is actuated.

15 Claims, 7 Drawing Sheets

U.S. PATENT DOCUMENTS

| | | |
|---|---|---|
| 6,722,067 B1 | 4/2004 | Kennedy et al. |
| 6,802,278 B2 | 10/2004 | McDonald |
| D503,842 S * | 4/2005 | Barnes .......................... D99/18 |
| 6,938,370 B2 * | 9/2005 | Johns ............................... 47/42 |
| 7,372,247 B1 | 5/2008 | Giusti |
| 2003/0196585 A1 * | 10/2003 | McDonald et al. ........... 116/211 |

* cited by examiner

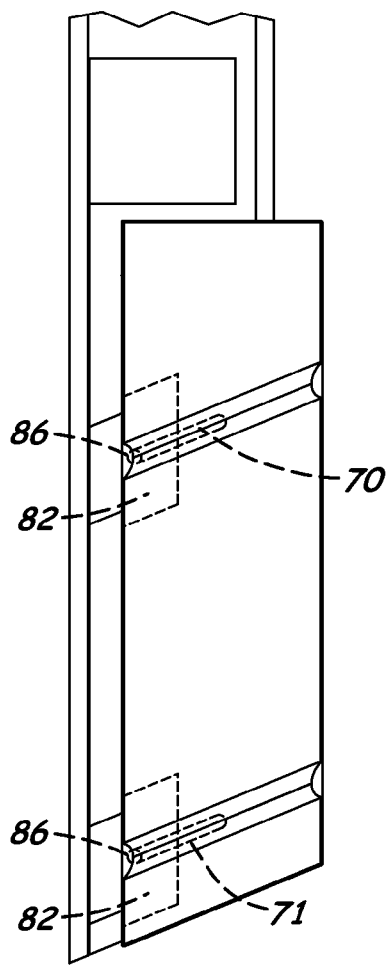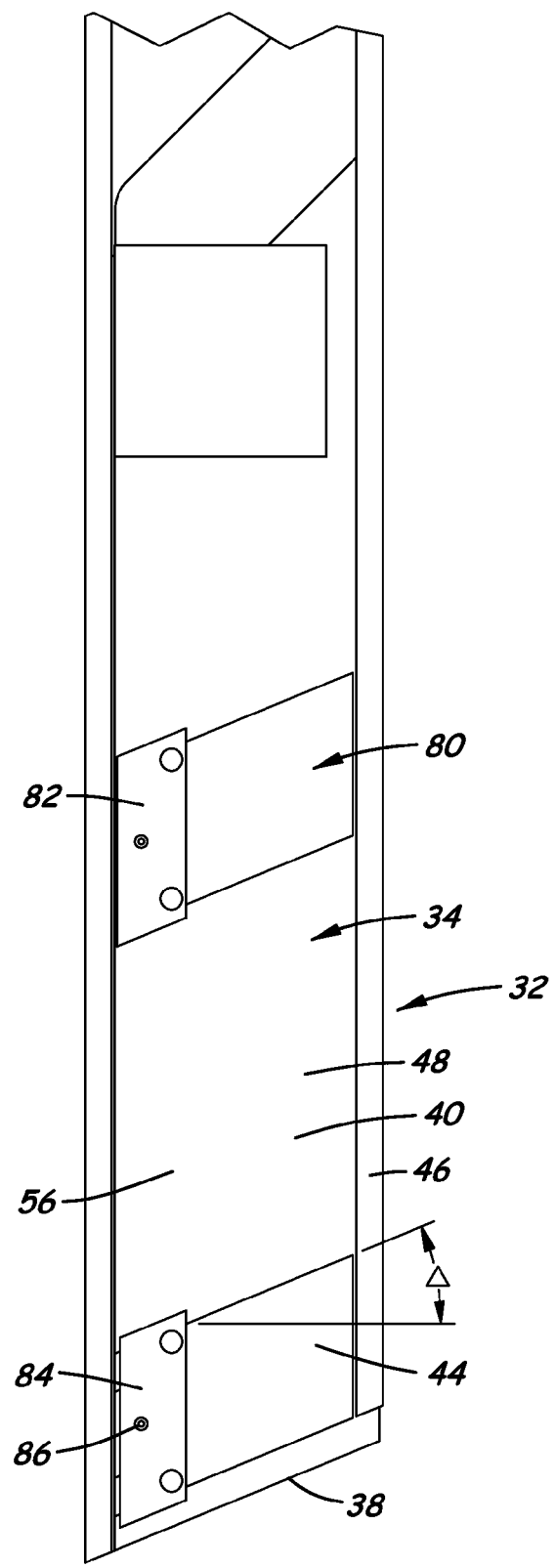
Fig. 6
Fig. 7

MARKER SYSTEM WITH MARKER AND INSTALLATION APPARATUS

BACKGROUND

1. Field

The present disclosure relates to ground marking systems, and more particularly pertains to a new marker system with a marker and an installation apparatus for marking a ground surface to, for example, indicate the presence of buried utilities, boundaries, events, advertising, etc. in a highly efficient and convenient manner.

2. Description of the Prior Art

It is often desirable to mark the ground surface to indicate, for example, the presence of underground utilities, the location of lot boundaries, and the like. This marking is often accomplished by the insertion of markers into the ground that extend upward from the ground surface and may include a flag at the top end. Numerous markers may be placed at spaced locations along the path of the buried utility line, and this may be true of each buried utility service (such as electric, gas, telephone, water, sewer).

However, the installation of the markers can be laborious, due to the numbers of markers that need to be placed as well as the manner in which the markers are inserted. The markers may be inserted by hand into the ground with no mechanical assistance, but this requires repeatedly bending down to engage and insert the marker into the ground surface. This repeated bending over can be physically taxing on the person performing the marking operation.

A number of devices have been proposed to facilitate the placement of markers. While these devices appear to work, some appear to actually make the insertion action more difficult by increasing the cross sectional profile of the portion of the marker that is being inserted into the ground (and thereby causing more resistance due to the larger profile), and/or requiring that a portion of apparatus be inserted in the ground as well. This approach can make it difficult if not impossible to insert markers in ground that is highly compacted, stony, or is slightly frozen, to name a few of the factors making the insertion more difficult.

Further, many of the known devices attempt to hold the marker by utilizing friction between the device and the marker to permit the device to move the marker. This approach tends to be less effective when, for example, using markers presenting a relatively large cross sectional profile and when the ground is compacted, stony, frozen, etc.

Some of the devices must be loaded with a marker each time that a marker is to be installed, which requires continual reloading of the device. Some devices require a relatively strong and rigid marker in order to push the marker into the ground, and this may require markers with thicker cross sectional sizes in order to provide the necessary rigidity.

It is therefore believed that there exists in the art a need for an improved marker system that avoids or mitigates the drawbacks of the known devices.

SUMMARY

In view of the foregoing disadvantages inherent in the known ground marking systems, the present disclosure describes a new marker system with a marker and an installation apparatus which may be utilized in a highly efficient and convenient manner to mark a ground surface.

The present disclosure relates to a new marker system with a marker installation system comprising at least one marker for marking a ground surface. The marker comprises a shaft, and the shaft has a bottom end and a top end. The shaft includes an insertion portion for insertion into the ground, and the insertion portion is located at the bottom end of the shaft. The shaft includes a mast portion for extending above the ground surface when the insertion portion is at least partially inserted into the ground. The shaft also includes an engagement portion located between the insertion portion and the mast portion, and the engagement portion is configured to resist further insertion of the shaft into the ground beyond the insertion portion. The system further includes a marker installation apparatus for inserting the at least one marker into a ground surface. The apparatus comprises a magazine assembly that defines a magazine space in which the at least one marker is positioned. The magazine space has a push position in the magazine space for receiving the at least one marker. The apparatus also includes a push assembly mounted on the magazine assembly. The push assembly engages the engagement portion of the shaft of the at least one marker when the marker is located in the push position, and the push assembly pushes the marker from the push position of the magazine assembly when the push assembly is actuated.

The foregoing is a general outline of some of the more significant aspects of the disclosure, and the detailed description of this application that follows discloses additional features of the disclosure which form the subject matter of the claims appended hereto.

The advantages of the various embodiments of the present disclosure, along with the various features of novelty that characterize the embodiments, are disclosed in the following descriptive matter and accompanying drawings.

BRIEF DESCRIPTION OF THE DRAWINGS

The disclosure will be better understood when consideration is given to the following detailed description thereof. Such description makes reference to the annexed drawings wherein:

FIG. 6 is a schematic front view of a portion of the marker installation apparatus, according to the illustrative embodiment, particularly showing the relationship of the sliders, the guideposts on the sliders, and the guide slots for the sliders on the cover.

FIG. 7 is a schematic front view of the marker installation apparatus, according to the illustrative embodiment, shown with the cover removed to show the sliders.

DESCRIPTION OF PREFERRED EMBODIMENTS

With reference now to the drawings, and in particular to FIGS. 1 through 11 thereof, the marker system with a marker and an installation apparatus of the present disclosure will be described.

In the following detailed description of embodiments according to the present disclosure, reference is made to the accompanying drawings which form a part hereof, and in which is shown by way of illustration specific preferred embodiments in which the system of the disclosure may be practiced. These embodiments are described in sufficient detail to enable those skilled in the art to practice the system of the disclosure, and it is to be understood that other embodiments may be utilized and that logical, mechanical and electrical changes may be made without departing from the spirit or scope of the disclosure. To avoid detail not necessary to enable those skilled in the art to practice the systems and methods of the disclosure, the description may omit certain information known to those skilled in the art. The following detailed description is, therefore, not to be taken in a limiting sense, and the scope of the present disclosure is defined only by the appended claims.

Figure 1:
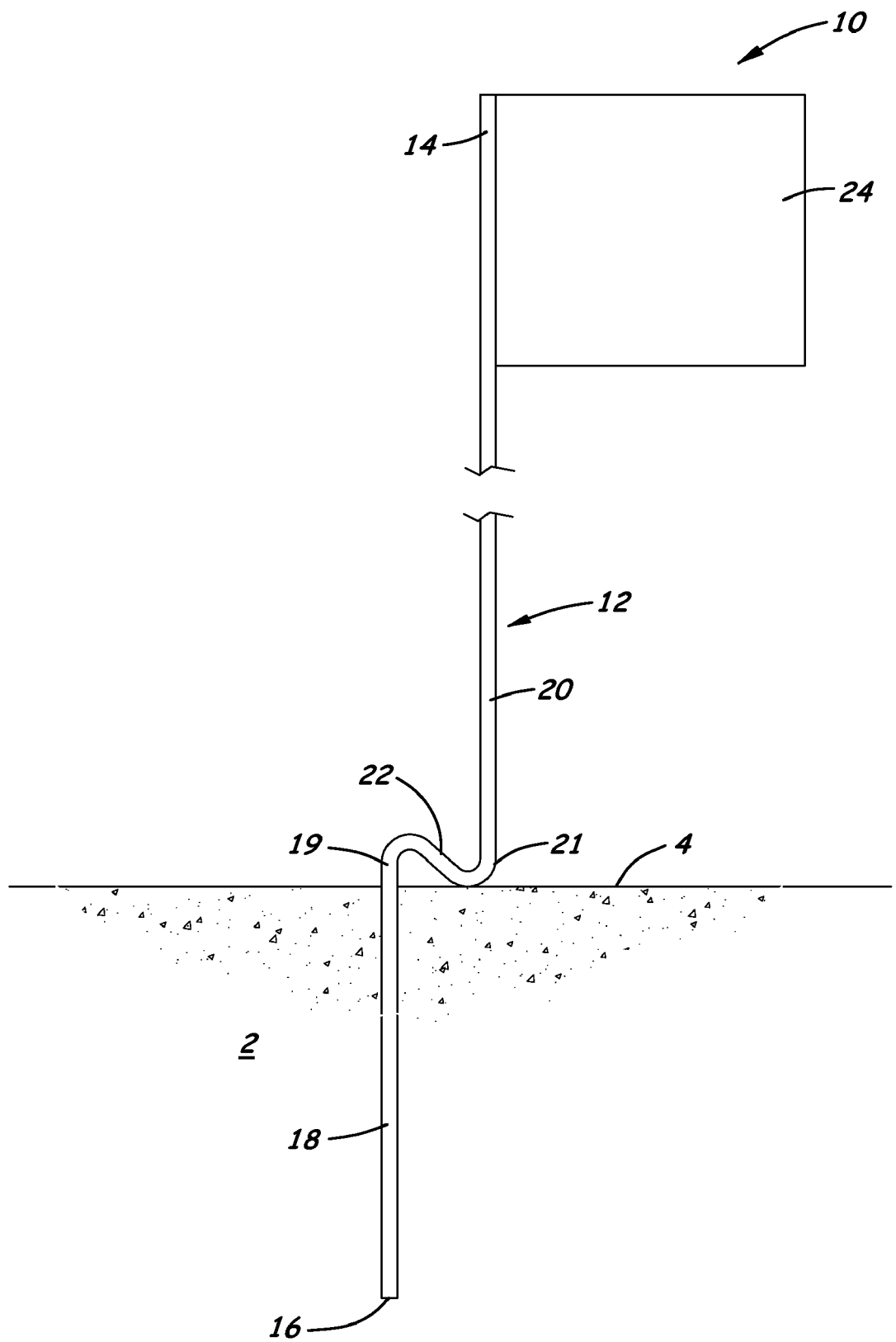
FIG. 1 is a schematic side view of a marker of a new marker installation system according to the present disclosure.
Figure 2:
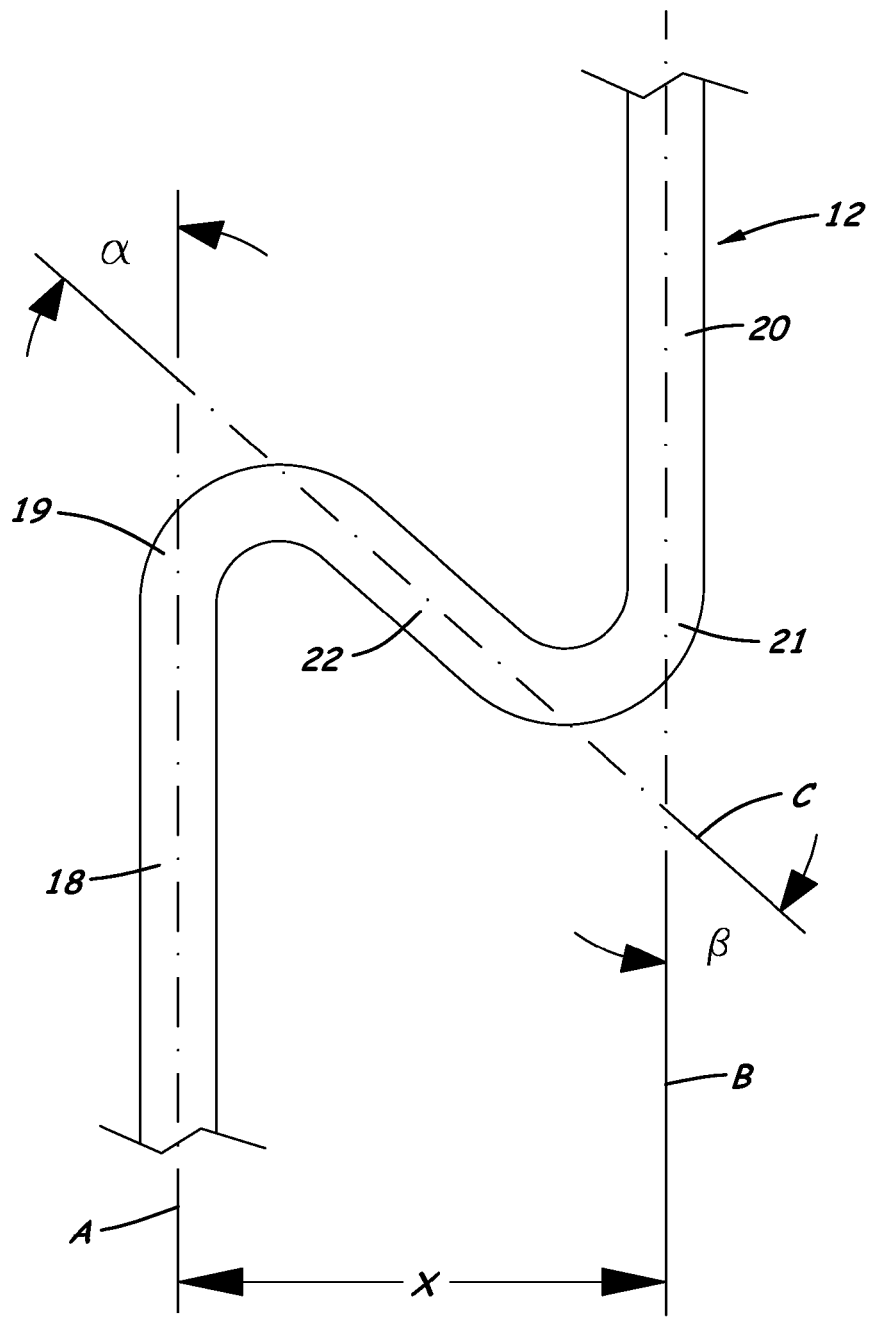
FIG. 2 is a schematic side view of a middle section of the marker, according to the illustrative embodiment.
Figure 3:
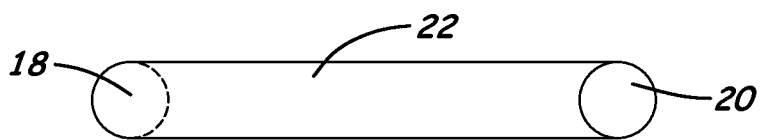
FIG. 3 is a schematic top end view of the marker, according to the illustrative embodiment.

One aspect of the disclosure relates to a marker 10 which is highly suitable for marking a ground surface, although other applications of the marker 10 may be utilized for marking other objects into which a portion of the marker may be inserted (see FIGS. 1 through 3). The marker 10 may be utilized for temporarily (or more permanently) marking on a ground surface the location of various otherwise hidden features, including, but not limited to, the location of property boundaries, the location of utility lines buried under the ground surface, as well as the location of any other demarcations such as for example, game field boundaries or path boundaries. The marker 10 may also have other less utilitarian purposes such as for providing decorative additions to a ground surface or to temporarily mark a path along a ground surface.

In greater detail, and as is illustratively shown in the drawings, the marker 10 may comprise a shaft 12 that is at least partially insertable through the ground surface and into the ground to provide a degree of resistance to prevent removal by, for example, wind or casual contact with passersby. The shaft 12 may have a top end 14 and a bottom end 16. The shaft 12 has a length that may be measured between the top 14 and bottom 16 ends. The shaft 12 may have a substantially uniform cross-sectional shape along the length of the shaft, and that shape may be substantially circular. It should be recognized that other cross sectional shapes of the shaft may be employed, including, but not limited to, rectangular, square, triangular, oval, etc. The shaft 12 may be formed of a wire material, and the wire material may be relatively resistant to bending, but as will be appreciated from the following, the illustrative apparatus employed to install the marker may provide support to the shaft 12 as the marker is being installed in the ground surface and thus the wire does not have to be made of a highly rigid material.

The shaft 12 of the marker 10 may be conceptually divided into a number of portions that may have different purposes or functions. The shaft 12 may include an insertion portion 18 for insertion into the ground 2 through the surface 4 of the ground. The insertion portion 18 may be located toward the bottom end 16 of the shaft 12, and may be adjacent to the bottom end. The insertion portion 18 may be, and preferably is, substantially linear and straight, and extends along an axis A. This feature of the insertion portion 18 greatly facilitates the insertion of the shaft into the ground 2, and reduces the degree of force that needs to be utilized to drive the insertion portion into the ground, as the shaft 12 only presents a profile as large as the cross sectional area of the shaft, that must be inserted through the surface 4 and into the ground 2. The insertion portion 18 has an upper extremity 19 located substantially opposite of the bottom end 16 of the shaft 12 on the insertion portion.

The shaft 12 may further include a mast portion 20 for extending above the ground surface 4 when the insertion portion 18 is at least partially inserted into the ground 2. The mast portion 20 may be substantially linear and straight, and may extend along an axis B. The axis B of the mast portion 20 may be oriented substantially parallel to the axis A of the insertion portion 18. The axis B of the mast portion 20 is preferably, but not necessarily, laterally offset by a distance X from the axis of the insertion portion. The offset of axis A from axis B may be in the range of approximately 0.1 inch to approximately 1.0 inch, although other offsets may be employed. The mast portion 20 may include a lower extremity 21 that is located substantially opposite of the top end 14 of the shaft 12 located on the mast portion.

The shaft 12 may also include an engagement portion 22 that is located between the insertion portion 18 and the mast portion 20 of the shaft 12. The engagement portion 22 may connect the mast portion 20 to the insertion portion 18, and thus may extend between the upper extremity 19 of the insertion portion 18 and the lower extremity 21 of the mast portion. The extent of the engagement portion 22 may be a function of the offset between the axes of the insertion 18 and mast 20 portions so that the greater the offset, the larger the size of the engagement portion and the smaller the offset, the smaller the size of the engagement portion.

In one significant aspect of the marker 10, the engagement portion 22 may be configured to provide a location for positive engagement of the shaft without increasing the cross sectional size of the portion of the marker 10 being inserted into the ground, and thus making the insertion more difficult in ground that is, for example, compacted, stony, somewhat frozen, etc. The positioning of the insertion portion 18 between the bottom end 16 of the marker and the engagement portion 22 where the positive engagement occurs does not require the engagement portion to be inserted into the ground when the marker is inserted into the ground. Further, utilization of the engagement portion 22 may avoid relying solely upon friction between a driving apparatus and the marker when inserting the marker into the ground. The engagement portion 22 may extend along an axis C. The axis C of the engagement portion 22 may be oriented at a non-zero angle α to the axis A of the insertion portion 18. Although it is contemplated that angles α measuring greater than zero degrees and less than or equal to approximately 135 degrees may be utilized, it is believed that angles α measuring at or between approximately 5 degrees and approximately 95 degrees with respect to the axis A of the insertion portion are the most effective for the purpose of providing a positive engagement with the shaft for insertion of the shaft 12 into the ground surface. In some embodiments, the angle α may be in the range of approximately 30 degrees and approximately 60 degrees. In still other embodiments, the angle α may be in the range of approximately 40 degrees and approximately 50 degrees. Illustratively, the angle α may be approximately 45 degrees.

Another function that the engagement portion 22 may provide to the marker 10 is its ability to resist or block further insertion of the shaft 12 into the ground 4 when the engagement portion contacts the ground surface, so that, for example, the marker 10 is not inserted in the ground beyond the insertion portion 18.

Similarly, although not necessarily identically, the axis C of the engagement portion 22 is oriented at a non-zero angle β to the axis B of the mast portion 20. The axis B of the mast portion 20 may be oriented at an angle β that is similar or identical to the angle α between the insertion 18 and engagement 22 portions so that the mast portion 20 extends substantially straight upward when the insertion portion 18 in inserted in the ground 2. The values of angle β may thus be substantially the same as the values for angle α noted above, although identical values are not critical.

Although the insertion 18, mast 20, and engagement 22 portions may be angled and offset from each other in a first reference plane, it should be appreciated that the portions 18, 20, and 22 of the shaft 12 may lie in a common plane that is oriented substantially perpendicular to the first reference plane.

The length of the insertion, engagement, and mast portions may vary. In some embodiments, the length of the insertion portion 18 is less than approximately 40% of an overall length of the marker 10 as measured from the bottom end 16 to the top end 14 (as contrasted with the actual length of the wire forming the shaft between the top and bottom ends), and may be less than approximately 25% of the overall length. In one illustrative embodiment, the length of the insertion portion 18 is a minimum of approximately 5% of the overall length of the marker, and in some embodiments may be approximately 25% of the overall length. In some embodiments, the insertion portion 18 may have a minimum length of approximately 1 inch and a maximum length of approximately 12 inches. In one embodiment, the length of the insertion portion is approximately 3 inches, and the overall length of the marker is approximately 24 to approximately 30 inches.

Preferably, but not critically, the marker 10 may also include a visual indicator 24 mounted on the shaft 12 that may increase the notice ability of the marker 10 and may convey information to a person viewing the indicator. In the illustrative embodiment, the visual indicator 24 comprises a flag mounted on the mast portion 20 of the shaft 12. The flag 24 may be mounted toward the top end 14 of the shaft 12. The flag 24 may be formed of a flexible material, and may comprise a sheet material.

In some aspects of the system, a plurality of markers 10 may be grouped together to facilitate transporting, storing, and loading of the quantities of markers that may be needed to complete the marking of, for example, a property boundary project. The plurality of markers may be grouped and held together in any suitable manner that permits each of the markers to be removed from the rest of the plurality when it is desired to insert the marker into the ground. For example, an adhesive may bond a portion of the shafts of adjacent markers in the plurality of markers together, and a suitable adhesive would not prevent dislodgment of one marker from the other markers when force is applied to the one marker in a direct parallel to the axis A of the marker. The markers may be secured together in a planar arrangement that locates markers on opposite sides of a marker in the line of markers. In the grouping of a plurality of markers, the bottom ends 16 of each of the markers 10 may be aligned along an axis that is substantially perpendicular to the axes A of the shafts, or the axis of the ends may be somewhat angled from the perpendicular so that the bottom ends of each successive shaft is positioned further back from the perpendicular line than the previous shaft in the rank of markers (see FIG. 10). The angle μ between the axis formed by the bottom ends 16 and the axes A of the shafts may be approximately in the range of approximately 0 degrees from the perpendicular to approximately 75 degrees from the perpendicular, and in some embodiments an angle μ of approximately 22.5 degrees is utilized.

Another aspect of the marker system 10 is directed to a marker installation apparatus 30 for inserting a marker into, for example, a ground surface (see FIGS. 4 through 9). The marker installation apparatus 30 may be employed to insert a portion of a marker, such as a marker 10 of the type described above, into the ground surface in a relatively quick and easy manner, and may help to cause the markers to be inserted in the ground at a relatively uniform distance that produces markers 10 that extend above the ground at a substantially uniform distance.

The marker installation apparatus 30 may generally include a magazine assembly 32 configured to hold at least one marker in a push position on the assembly 32, a push assembly 100 to push a marker in the push position from the apparatus 30, and a biasing assembly 80 configured to bias markers in the magazine assembly toward the push position.

In greater detail, the magazine assembly 32 defines a magazine space 34 that is configured to receive at least one marker 10, and preferably a plurality of markers 10 positioned in an array of adjacent markers. The magazine assembly 32 may be elongated and may have a top end 36 and a bottom end 38, with a longitudinal direction extending through the top 36 and bottom 38 ends. The top end and bottom end designations refer to the orientation of the apparatus 30 when it is positioned for use in placing a marker in a ground surface.

The magazine assembly 32 may include a base member 40 that may extend from the top end 36 to the bottom end 38 of the magazine assembly. The base member 40 may have a rear wall 44 with a front 48. The magazine assembly 32 may further include a first side member 46 that is mounted on a first side of the base member 40, and a second side member 50 that is mounted on a second side of the base member. The first 46 and second 50 side members may thus be positioned on opposite sides of the base member 40. In the illustrative embodiments, the first side member 46 and the second side member 50 each have a channel shape that receives a portion of the respective side of the base member 40. Optionally, the first side member 46 and the second side member 50 may be combined with the base member 40, and thus may not be formed of parts separate from the part of the base member.

A barrel bore 52 may be formed by elements of the magazine assembly 32. In the illustrative embodiment, the barrel bore 52 may be formed by an inner surface of the second side member 50 and a surface of the second side of the base member, and may be formed in a gap between these elements (see FIG. 8). A tab slot 54 may also be formed between the second side member 50 and the base member 40, and the tab slot 54 may be in communication with the barrel bore 52 and the magazine space 34. The barrel bore 52 may extend from the bottom end 38 of the base member toward the top end 36 of the base member. The tab slot 54 may also extend from the bottom end 38 toward the top end 36 of the magazine assembly.

The magazine assembly 32 may further comprise a support member 56 that is mounted on the base member 40. The support member 56 may be positioned forward of the front 48 of the rear wall 44, or may be formed as an integral portion of the base member. The support member 56 may have a front surface 58, and markers 10 positioned in the magazine space may be abutted against the front surface 58, and may be housed between the front surface 58 and the cover 66. The support member 56 may form at least one guide channel 60, and the guide channel 60 may extend laterally with respect to the longitudinal direction of the magazine assembly 32. The magazine assembly 32 may include more than one support member 56, and may define more than one guide channel. In the illustrative embodiments, the lowermost guide channel 60 receives the engagement portion 22 and the insertion portion 18 of the marker, while the mast portion may rest against the front surface 58 of the support member 56. An ejection aperture 76 may be located in the bottom end 38 of the base member 40 to permit the movement of a marker 10 out of the magazine space 34, and the ejection aperture 76 may be in communication with the magazine space in which the markers are stored, and may be aligned with the push position of the marker in the magazine space, so that a marker may be ejected out of the magazine space through the ejection aperture.

The support member 56 may define a shoulder 62 for abutting against the engagement portion 22 of markers 10 positioned in the magazine space 34 of the magazine assembly 32. A plurality of the markers 10 may be arrayed along the shoulder 62 in the magazine space, although only one is shown in the drawings for the sake of clarity of illustration. The shoulder 62 may be partially formed by the front surface 58 of the support member, and may extend across the support member laterally in a direction that is substantially transverse to the longitudinal direction of the magazine assembly 32. The shoulder 62 may extend at an angle Δ with respect to a line oriented substantially perpendicular to the barrel bore 52, and the angle Δ may be substantially equal to the angle of the bottom end 38 of the magazine assembly with respect to a line perpendicular to the barrel bore. The angle Δ may measure between approximately 0 degrees and approximately 75 degrees from a line oriented perpendicular to the axis of the barrel bore 52. In the illustrative embodiment, the angle Δ is approximately 22.5 degrees.

Figure 4:
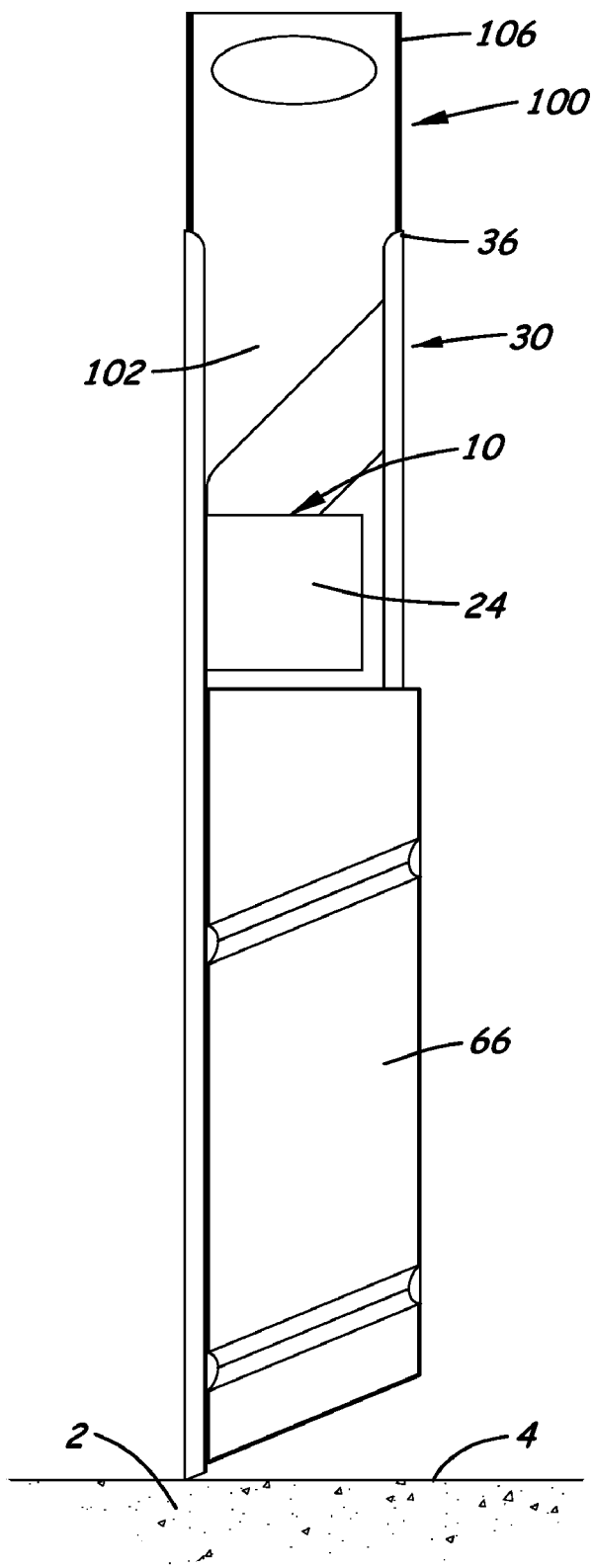
FIG. 4 is a schematic front view of the marker installation apparatus, according to an illustrative embodiment, with the cover member shown in an operating position.
Figure 5:
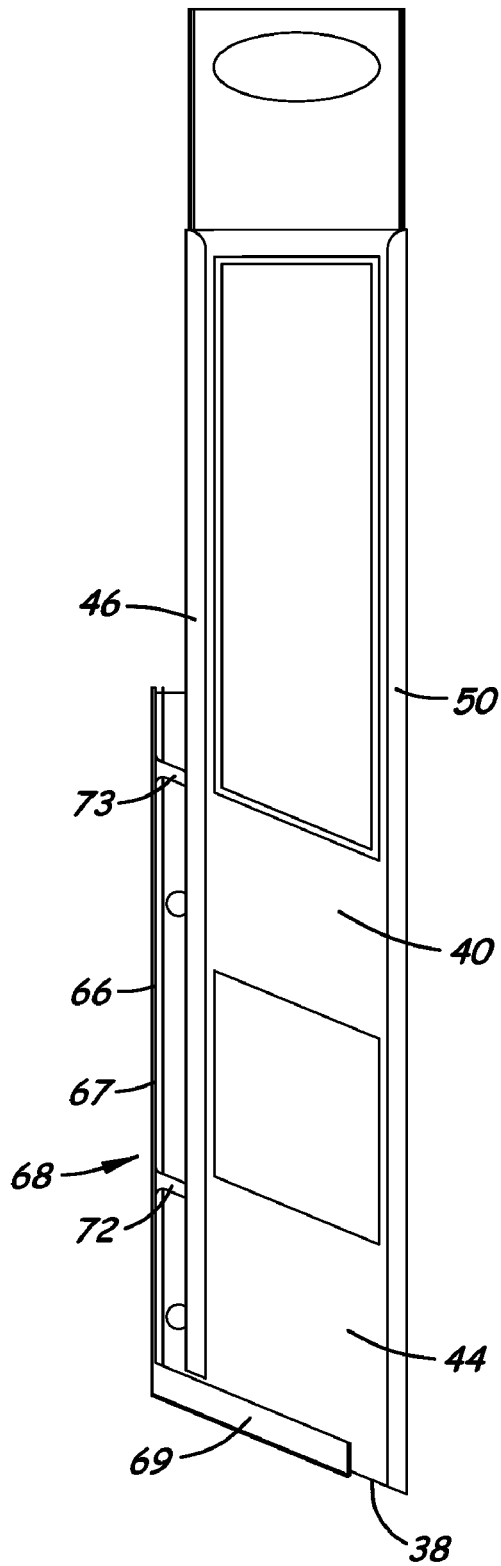
FIG. 5 is a schematic rear view of the marker installation apparatus, according to the illustrative embodiment, with the cover member shown in the partially open position.
Figure 8:
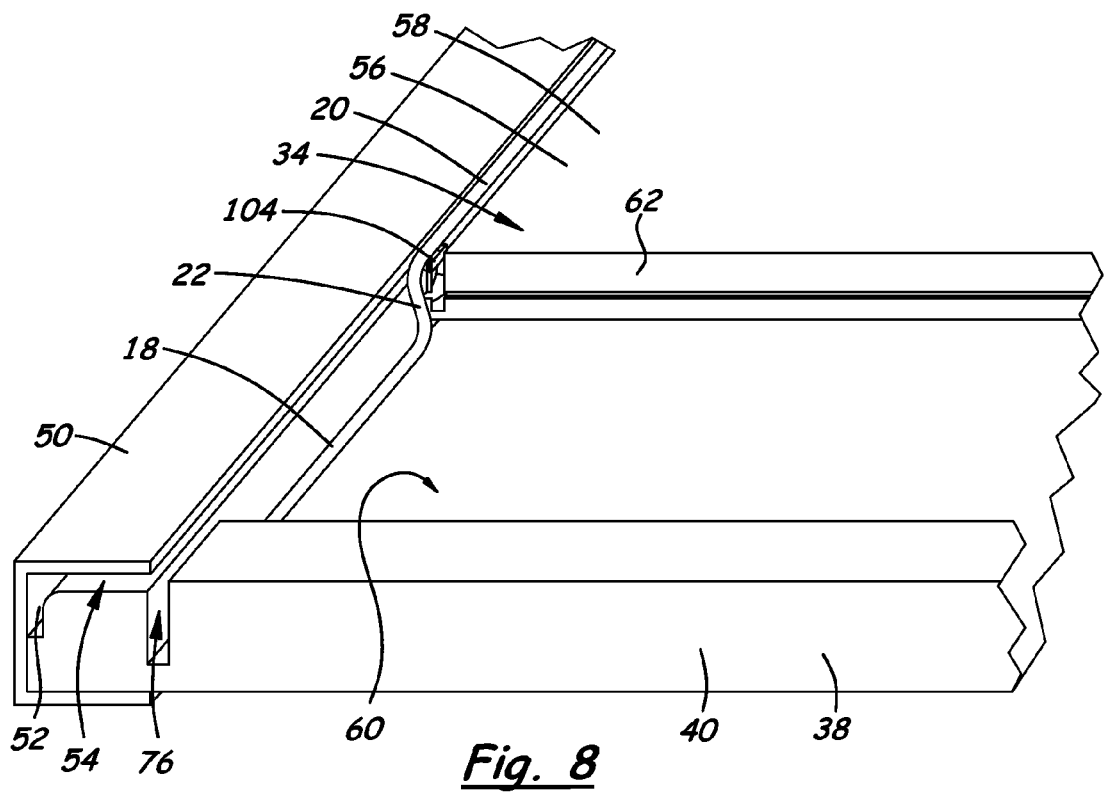
FIG. 8 is a schematic perspective view of a portion of the marker installation apparatus, according to the illustrative embodiment, with the cover removed and portions of the base member broken away.
Figure 9:
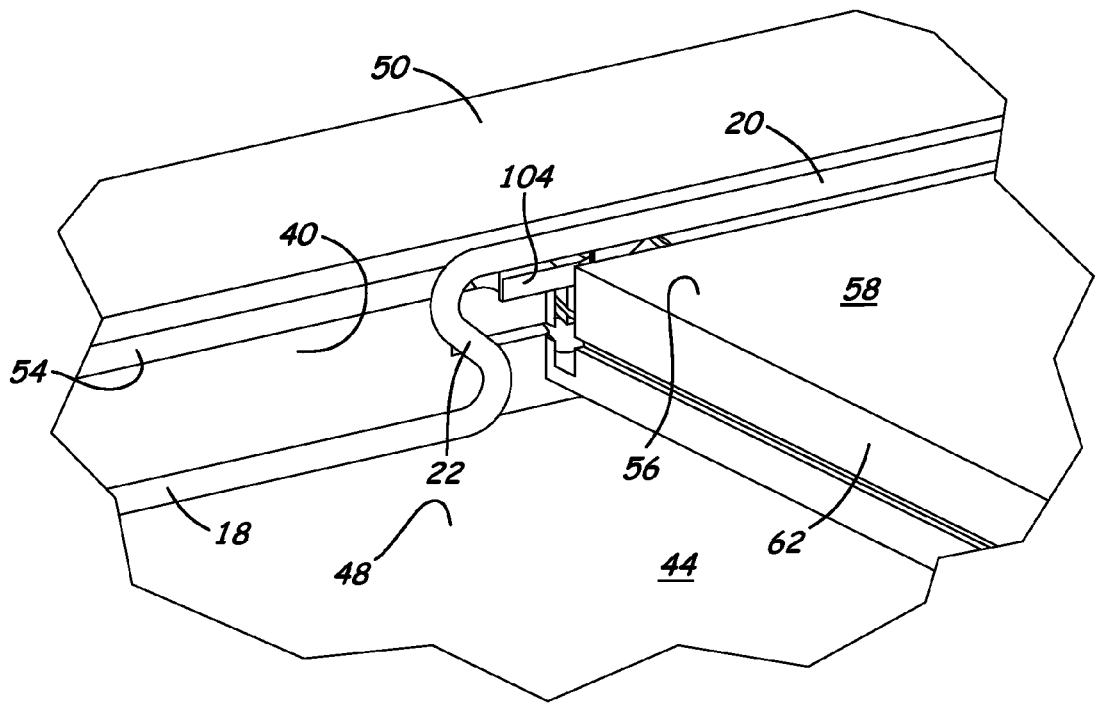
FIG. 9 is a schematic perspective view of a portion of the marker installation apparatus, according to the illustrative embodiment, with the cover member removed and portions of the base member broken away to show the engagement between the marker and the installation apparatus.
Figure 10:
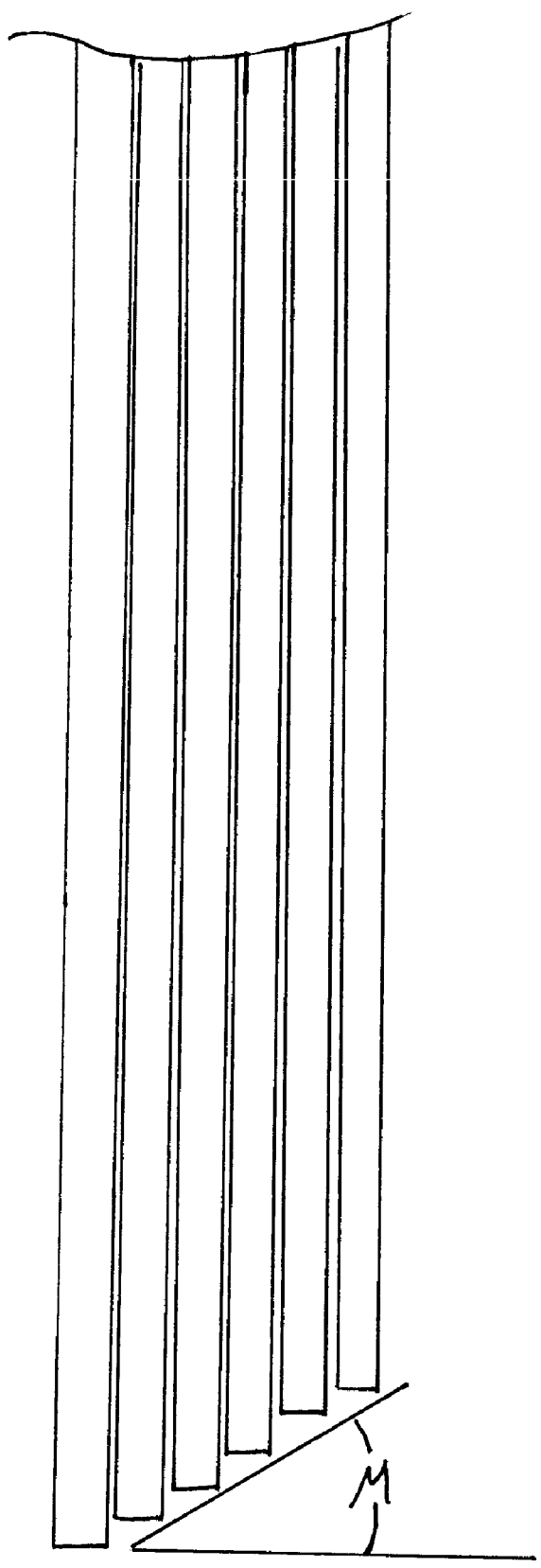
FIG. 10 is a schematic top view of the lower portions of a grouping of a plurality of markers.

The magazine assembly 32 may also include a cover member 66 mounted on the base member 40. The cover member 66 may be mounted in a manner that permits movement of the cover member 66 with respect to the base member 40 to open up and expose a portion of the magazine space 34 to permit loading of markers 10 into the magazine space. The cover member 66 may be movable between a closed position and an open position. The closed position may be characterized by the cover member 66 covering at least a portion of the front surface 58 of the support member 56 to retain the markers in the magazine space against the front surface 58 of the support member. FIGS. 4 through 6 show the cover member 66 is a partially open position, but the cover member is almost in the closed position. The cover member 66 may be close to the second side member 50 and barrel bore 52. The open position of the cover member 66 may be characterized by the cover member 66 exposing at least a portion of the front surface 58 of the support member 56 so that markers 10 may be placed against the front surface to load the magazine space. The closed position of the cover member 66 may be characterized by the cover member completely, or substantially completely covering the magazine space. In the closed position, the cover member 66 may only partially cover the magazine space 34 so that elements of the markers 10, such as the flags of the markers, are able to extend out of the magazine space past the cover member. This relationship may also serve to provide the user with a visual indication of the number of markers remaining in the magazine space 34 when the cover member is in the closed position.

The magazine assembly 32 may further include a cover support structure 68 that is configured to support the cover member 66 at least in the open position of the cover member, and as the cover member 66 moves from the closed position toward the open position. The cover support structure 68 may also guide the movement of the cover member 66 between the open and closed positions. In the illustrative embodiment, the cover support structure 68 includes one or more supports shafts 72, 73 that are mounted on a flange 67 of the cover member 66 and that extend through respective apertures formed in the first side member 46. The support shafts 72, 73 permit movement of the cover member 66 between the open and closed positions while guiding the movement of the cover member 66. The cover member 66 may also include a guide member 69 that is located on a lower end of the cover member 66. The guide member 69 may form a channel or pocket-like structure that receives the bottom end of the base member 40, and the bottom end moves in the channel as the cover member moves between the open and closed positions. The guide member 69, as well as the support shafts 72, 73 may be positioned in an orientation that causes movement of the cover member 66 that is angled somewhat with respect to the line perpendicular to the bore 52, such as a path that is oriented at the angle γ. Optionally, a path that is oriented substantially perpendicular to the axis of the barrel bore 52 may be employed. The cover member 66 may also include at least one guide slot 70, and preferably includes a plurality of guide slots 70, 71 that extend into the cover member, although the slots may not completely extend through the cover member. For example, the slots 70, 71 may be covered as shown in FIGS. 4 and 6.

The installation apparatus 30 may also include a biasing assembly 80 that is configured to bias at least one marker 10 positioned in the magazine space 34 (or more than one marker, if a plurality of markers is positioned in the magazine space) toward the push position on the magazine assembly 32. The push position may be located at one side of the magazine space 34, and may be aligned with the ejection aperture 76. FIG. 7 shows a single marker 10 in the magazine space 34, and it is located in the push position, which is located to the extreme left in the magazine space. It should be recognized that, while one marker is illustrated for the purposes of clarity, several of the markers may be located in the magazine space and would be positioned to the right of the marker shown in FIG. 7, with the visual indicators of those markers being stacked on top of the visual indicator of the marker in the push position. The plurality of markers 10 would be moved toward the push position by the biasing assembly 80 so that the markers are positioned toward the left in the magazine space, and as one marker is ejected from the push position, another marker (if present) is biased or slid into the push position by the biasing assembly. The biasing assembly 80 may be mounted on the magazine assembly 32, and may be mounted on the support member 56 of the magazine assembly. In the exemplary embodiment, two of the biasing assemblies are employed, although more or less of the biasing assemblies may be employed.

In some embodiments, the biasing assembly 80 includes a slider member 82 that is mounted on the base member 40, preferably in a slidable relationship with the base member. Illustratively, the biasing assembly 80 includes a pair of slider members 82, 84, and each of the slider members may be positioned in a guide channel. The slider members 82, 84 may be slidable toward the push position, with a retracted position and an extended position. The extended position may be located toward the push position on the magazine assembly 34 and the retracted position may be at a location that is spaced from the extended position toward the first side member 46 of the main portion of the base member. The slider member 82 may be biased and moved toward the push position of the magazine space by a biasing element 90. The biasing element 90 may be of any known configuration that is suitable and effective for moving the slider member toward the push position.

Figure 11:
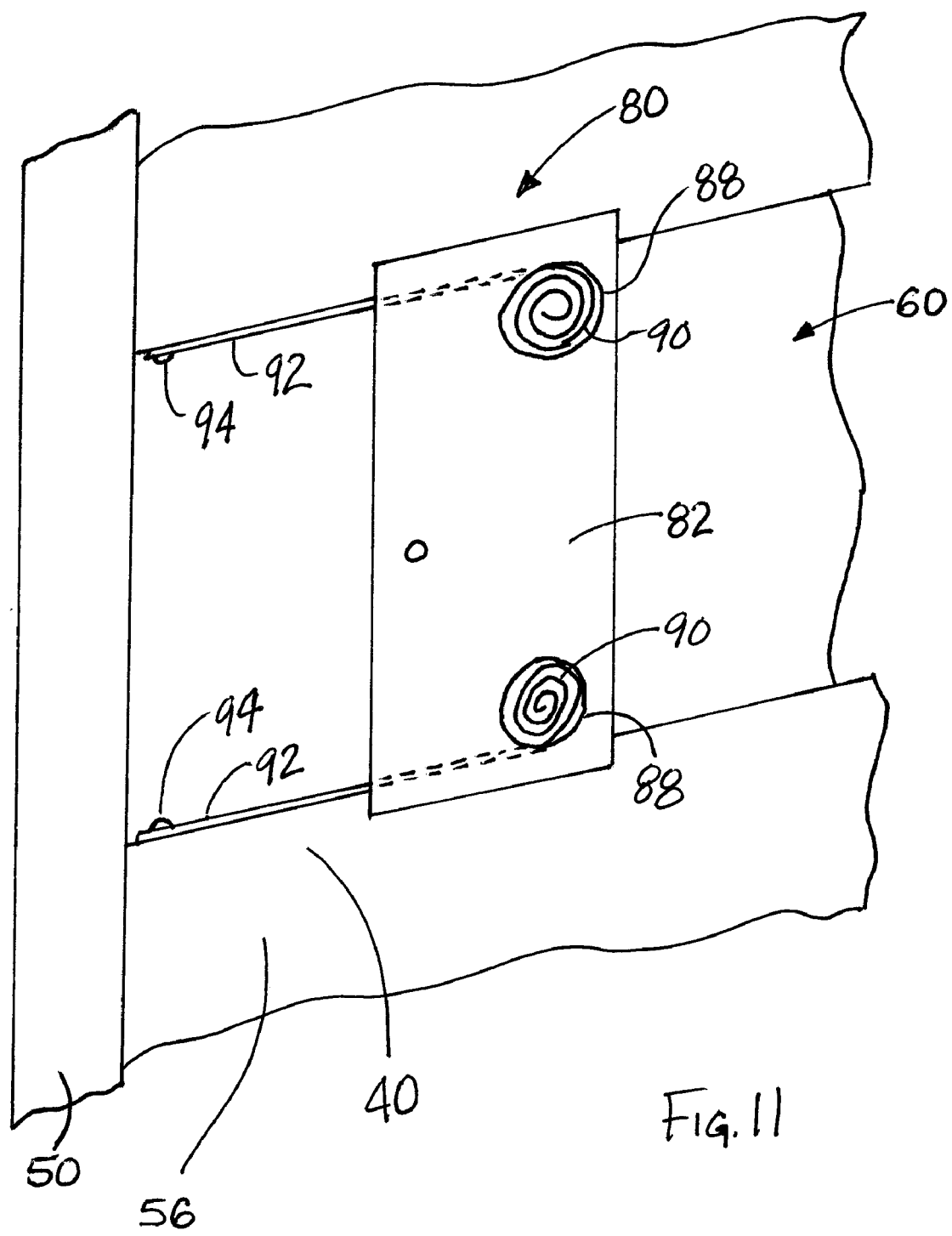
FIG. 11 is a schematic top view of a portion of the base member showing one of the slider members and the biasing assembly.

In some embodiments, such as is illustratively shown in FIG. 11, the biasing element 90 is a coiled spring positioned in a well 88 forming in the slider member 82, and each slider 82, 84 may include a pair of the wells 88 formed therein with a spring 90. The spring 90 may be of the mainspring type that may be unwound from the coil upon the application of force, but resists the unwinding from the coiled configuration, and seeks to resume the coiled configuration when the force is removed. An end portion 92 of the spring 90 may extend out of the well 88 and through the side of the slider member and may be attached to the base member 40 by a fastener 94, so that movement of the slider away from the push position causes the spring to be unwound from the coil and withdrawn from the well 88. The unwinding of the spring by movement of the slider member away from the push position tends to be resisted by the spring 90, and tends to bias the slider member toward the push position. Movement of the slider member 82 away from the push position requires the application of force, such as by finger or hand pressure, to load one or more markers 10 into the magazine space. Upon release of the force from the slider member 82, the slider member moves toward the push position as the springs 90 try to recoil from the partially uncoiled condition. Of course, while the described spring biasing element is highly compact and useful, the biasing element may comprise other structures such as, for example, compression and tension springs.

Each of the slider members 82, 84 may have a top surface with a guide post 86 mounted thereon, and the guide post may be movable in a respective one of the guide slots 70, 71 formed in the cover member 66. The slider members 82, 84 are thus moveable with respect to the cover member 66, but are confined to movement within the respective guide slot 70, 71. Advantageously, the movement of the cover member 66 from the closed position toward the open position causes the slider members 82, 84 to be moved away from the push position in the magazine space to permit the insertion of additional markers 10 in the magazine space between the slider members 82, 84 and the push position. The slider member 82 may be positioned in the guide channel 60 which may serve to guide the movement of the slider member with respect to the base member 40. The slider member 82 may have a height that is somewhat taller or higher than the front surface 58 of the support member 56 so that the slider member protrudes out of the guide channel 60 and is able to engage and press against the markers to move them along the support member.

The installation apparatus 30 may further comprise a push assembly 100 that is configured to push a marker 10 from the magazine assembly 32 when the user actuates the push assembly. More specifically, the push assembly 100 is able to push a marker 10 located in the push position from the magazine assembly 32 through the ejection aperture 76 in a manner so that the marker enters, for example, a ground surface positioned below the bottom end 38 of the installation apparatus 30.

The push assembly 100 may include a push member 102 that is mounted on the base member 40 in a manner that permits movement of the push member 102 with respect to the base member. The push member 102 may have a portion that is movable in the barrel bore 52 and the tab slot 54 of the base member. The push member 102 may have a marker engagement tab 104 that moves with the push member and is configured to engage the particular marker 10 located in the push position. The marker engagement tab 104 may extend from the interior of the barrel bore 52 through the tab slot 54 into the magazine space 34 and into the push position, which may be located adjacent to the tab slot 54. The marker engagement tab 104 may have a curved lower surface that positioned to engage or hook the engagement portion 22 of the marker 10 when the push member 102 is moved in the barrel bore 52 in a downward direction. The curved lower surface is highly suitable for engaging the cylindrical outer surface of the marker.

Significantly, the marker engagement tab 104 of the push member engages the engagement portion 22 of the marker 10 in the push position and applies the push insertion force to the marker at the engagement portion. The engagement portion 22 of the marker may be located toward, but preferably not at, the bottom end 16 of the marker, so that the insertion force applied by the push member does not have to be transmitted, for example, through the entire length of the marker, which would be the case if the push member 102 acted on the top end 14 of the marker. In the preferred embodiments of the system 10, neither the push member 102 nor the marker engagement tab 104 needs to extend out of the magazine assembly (such as out of the barrel bore) when the push assembly is actuated to push or eject the marker from the magazine assembly, and thus the push member does not penetrate the ground surface as the insertion portion of the shaft of the marker is inserted into the ground (although that it should be recognized that there may be a small amount of protrusion by the end of the member 102). By engaging the engagement portion of the marker shaft which is spaced from the bottom of the shaft, the push assembly is able to push the marker through the ejection aperture 76 into the ground surface without entering the ground surface. Moreover, the engagement portion 22 tends to function to block further insertion of the shaft into the ground surface beyond the insertion portion as the engagement portion contacts the ground surface.

The push assembly 100 may also include a handle member 106 that is configured to move the push member 102 with respect to the base member 40. The handle member 106 may be mounted on the push member 102 at a location substantially opposite of the marker engagement tab 104, and adjacent to the top end 36 of the magazine assembly so that the handle member 106 is located at the top of the installation apparatus 30 when the installation apparatus is positioned for use.

With the installation apparatus 30, insertion of many markers 10 may be easily and quickly accomplished in rapid succession, with minimal bending by the user. Since the force applied to each marker 10 is applied at the engagement portion, relatively close to, but not at, the bottom end 16 of the marker, the marker is less likely to deflect when the end 16 encounters hard ground.

The words "exemplary" and "illustrative" are used herein to mean "serving as an example, instance, or illustration." Any embodiment described herein as "exemplary" or "illustrative" is not necessarily to be construed as preferred or advantageous over other embodiments. Likewise, the term "embodiments of the disclosure" does not require that all embodiments of the disclosure include the discussed feature, advantage or mode of operation.

Aspects of the system of the disclosure are disclosed in the description and related drawings directed to specific embodiments of the disclosure. Alternate embodiments may be devised without departing from the scope of the disclosure. Additionally, well-known elements of the system of the disclosure will not be described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Moreover, in the foregoing Detailed Description, it can be seen that various features are described in the context of a single embodiment for the purpose of streamlining the disclosure. The disclosure of a single embodiment is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Further, where the term "substantially" is used, it is intended to mean "for the most part" or "being largely but not wholly that which is specified".

I claim:

1. A marker installation system, comprising:
    at least one marker for marking a ground surface, the marker comprising a shaft, the shaft having a bottom end and a top end, the shaft including an insertion portion for insertion into the ground, the insertion portion being located at the bottom end of the shaft, the shaft including a mast portion for extending above the ground surface when the insertion portion is at least partially inserted into the ground, the shaft including an engagement portion located between the insertion portion and the mast portion, the engagement portion being configured to resist further insertion of the shaft into the ground beyond the insertion portion; and
    a marker installation apparatus for inserting the at least one marker into a ground surface, the apparatus comprising:
        a magazine assembly defining a magazine space in which the at least one marker is positioned, the magazine space having a push position in the magazine space for receiving the at least one marker; and
        a push assembly mounted on the magazine assembly, the push assembly engaging the engagement portion of the shaft of the at least one marker when the marker is located in the push position, the push assembly pushing the marker from the push position of the magazine assembly when the push assembly is actuated;
    wherein an axis of the engagement portion of the at least one marker is oriented at a non-zero angle to an axis of the insertion portion; and
    wherein the angle measures between approximately 30 degrees and approximately 60 degrees.

2. The system of claim 1 wherein an axis along which the mast portion of the at least one marker extends is substantially parallel to an axis along which the insertion portion extends.

3. The system of claim 1 wherein an axis along which the mast portion of the at least one marker extends is offset from an axis along which the insertion portion extends.

4. The system of claim 1 wherein an axis along which the mast portion of the at least one marker extends is substantially parallel to an axis along which the insertion portion extends; and
    wherein the axis along which the mast portion extends is offset from the axis along which the insertion portion extends.

5. The system of claim 1 additionally comprising a visual indicator mounted on the shaft of the at least one marker.

6. The system of claim 5 wherein the visual indicator comprises a flag mounted on the mast portion of the shaft of the at least one marker.

7. The system of claim 1 wherein the angle measures between approximately 5 degrees and approximately 135 degrees.

8. The system of claim 1 wherein an angle between an axis of the engagement portion of the at least one marker and an axis of the insertion portion of the at least one marker is substantially equal to an angle between the axis of the engagement portion and an axis of the mast portion.

9. The system of claim 1 wherein the magazine assembly of the marker installation apparatus includes a base member defining a shoulder configured to abut against the engagement portion of markers when the markers are positioned in the magazine space.

10. The system of claim 9 wherein the push assembly of the marker installation apparatus comprises a push member being mounted on the base member, the push member being movably mounted in a barrel bore of the base member of the magazine assembly.

11. The system of claim 10 wherein the push member has a marker engagement tab that is configured to engage the engagement portion of the at least one marker positioned in the push position.

12. The system of claim 1 additionally comprising a biasing assembly mounted on the magazine assembly and configured to bias the at least one marker in the magazine space toward the push position on the magazine assembly.

13. The system of claim 12 wherein the biasing assembly comprises:
    at least one slider member mounted on the magazine assembly and configured to contact any markers positioned in the magazine space, the at least one slider member being movable in the magazine space toward and away from the push position, and
    a biasing element configured to bias the slider member toward the push position such that the at least one slider contacts and biases any markers in the magazine space toward the push position.

14. The system of claim 13 wherein the slider member defines a well, and the biasing element of the biasing assembly comprises a coiled spring located in the well and having a free end fastened to the magazine assembly, the biasing assembly being configured such that movement of the slider member with respect to the magazine assembly away from the push position tends to unwind the coiled spring and movement of the slider member with respect to the magazine assembly toward the push position such that the coiled spring tends to bias the slider member toward the push position.

15. The system of claim 1 wherein the magazine assembly defines a barrel bore and a tab slot, the tab slot being in communication with the barrel bore and the magazine space; and wherein the push assembly comprises a push member having a portion positioned in the barrel bore and a marker engagement tab positioned in the tab slot and extending into the magazine space in a manner permitting the push tab to engage the engagement portion of a marker when the marker is positioned in the push position.

* * * * *